US008654852B2

(12) United States Patent
Tseng et al.

(10) Patent No.: US 8,654,852 B2
(45) Date of Patent: Feb. 18, 2014

(54) CIRCUIT FOR PERFORMING MOTION ESTIMATION AND MOTION COMPENSATION

(75) Inventors: Yung-Sheng Tseng, Tainan (TW); Chih-Yeh Tseng, Tainan (TW)

(73) Assignee: Himax Technologies Ltd., Tainan (TW)

( * ) Notice: Subject to any disclaimer, the term of this patent is extended or adjusted under 35 U.S.C. 154(b) by 820 days.

(21) Appl. No.: 12/795,146

(22) Filed: Jun. 7, 2010

(65) Prior Publication Data

US 2011/0298987 A1    Dec. 8, 2011

(51) Int. Cl.
*H04N 5/14*    (2006.01)

(52) U.S. Cl.
USPC ..................................... 375/240.16

(58) Field of Classification Search
CPC ...................................... H04N 5/145
USPC ........................................... 375/16
See application file for complete search history.

(56) References Cited

U.S. PATENT DOCUMENTS

| | | | | |
|---|---|---|---|---|
| 5,400,087 A | * | 3/1995 | Uramoto et al. | 348/699 |
| 6,330,282 B1 | * | 12/2001 | Miyazaki | 375/240.16 |
| 6,765,965 B1 | * | 7/2004 | Hanami et al. | 375/240.16 |
| 7,126,991 B1 | * | 10/2006 | Mimar | 375/240.16 |
| 2003/0012281 A1 | * | 1/2003 | Cho et al. | 375/240.16 |
| 2003/0016748 A1 | * | 1/2003 | Hwang et al. | 375/240.12 |
| 2006/0002472 A1 | * | 1/2006 | Mehta et al. | 375/240.16 |
| 2009/0085846 A1 | * | 4/2009 | Cho et al. | 345/87 |

* cited by examiner

*Primary Examiner* — Mehrdad Dastouri
*Assistant Examiner* — Mohammed Rahaman
(74) *Attorney, Agent, or Firm* — Stout, Uxa, Buyan & Mullins, LLP

(57) ABSTRACT

Circuits for performing motion estimation (ME) and motion compensation (MC) are disclosed. In the ME circuit, rows of a first register are correspondingly coupled to rows of a first memory that stores a search range of a first frame, and rows of a second register are correspondingly coupled to rows of a second memory that stores a search range of a second frame. Block-matching metric calculations are performed through the search range to obtain a motion vector (MV). In the MC circuit, first multiplexers couples each row of a first register to corresponding row of a first memory, and each macro block (MB) may accordingly be selected from the first memory and loaded into the first register. Second multiplexers couples each row of a second register to corresponding row of a second memory, and each MB may accordingly be selected from the second memory and loaded into the second register.

8 Claims, 10 Drawing Sheets

Frame 1

Frame 2 forward estimation
Frame 1 backward estimation
Frame 2

Frame 1  Frame 2 forward estimation  backward estimation
Frame 1  Frame 2

| 35 | 34 | 33 | 32 | 31 | 30 | 29 |
|----|----|----|----|----|----|----|
| 36 | 16 | 15 | 14 | 13 | 12 | 28 |
| 37 | 17 | 5  | 4  | 3  | 11 | 27 |
| 38 | 18 | 6  | 1  | 2  | 10 | 26 |
| 39 | 19 | 7  | 8  | 9  | 25 | 49 |
| 40 | 20 | 21 | 22 | 23 | 24 | 48 |
| 41 | 42 | 43 | 44 | 45 | 46 | 47 |
Frame 1
| 47 | 46 | 45 | 44 | 43 | 42 | 41 |
|----|----|----|----|----|----|----|
| 48 | 24 | 23 | 22 | 21 | 20 | 40 |
| 49 | 25 | 9  | 8  | 7  | 19 | 39 |
| 26 | 10 | 2  | 1  | 6  | 18 | 38 |
| 27 | 11 | 3  | 4  | 5  | 17 | 37 |
| 28 | 12 | 13 | 14 | 15 | 16 | 36 |
| 29 | 30 | 31 | 32 | 33 | 34 | 35 |
Frame 2
FIG. 3
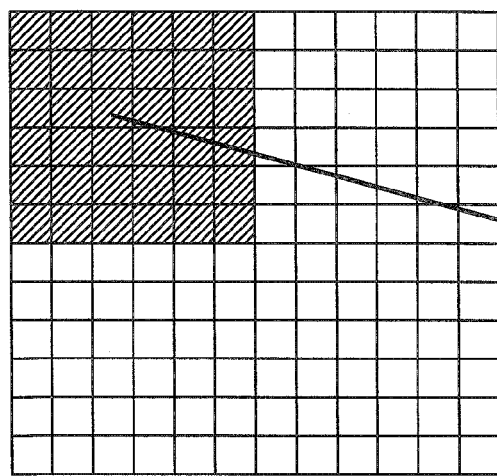
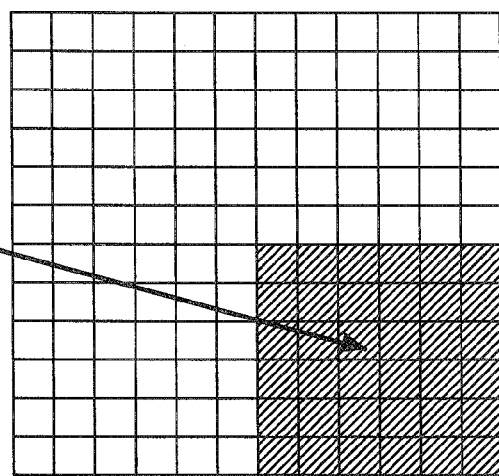
Frame 1          Frame 2
FIG. 4

Frame 2

Frame 1

CIRCUIT FOR PERFORMING MOTION ESTIMATION AND MOTION COMPENSATION

BACKGROUND OF THE INVENTION

1. Field of the Invention

The present invention generally relates to digital image processing, and more particularly to circuits for implementing motion estimation (ME) and motion compensation (MC).

2. Description of Related Art

Motion estimation (ME) is one technique of digital image processing for determining a motion vector (MV) that represents object movement between two adjacent frames in a video sequence. The MV is then applied in motion compensation (MC) to create an intermediate frame or frames between the two adjacent frames, facilitating, for example, frame rate up conversion (FRUC) or video compression.

There are some algorithms disclosed for performing the ME or MC. However, most ME or MC algorithms are math-heavy and thus are not suitable to be implemented by software in a real-time application. Even though the ME or MC algorithm may be implemented in hardware circuit to realize the real-time application, the required circuit area is usually too tremendous to be practically implemented at an acceptable cost.

For the reason that conventional ME or MC algorithms are either ineffective or unpractical for implementation, a need has arisen to propose a novel ME or MC algorithm and an associated circuit for implementing the ME/MC algorithm.

SUMMARY OF THE INVENTION

In view of the foregoing, it is an object of the embodiment of the present invention to provide a circuit for performing motion estimation (ME) and a circuit for performing motion compensation (MC) with hardware circuit and associated wirings that are substantially reduced in amount compared to the conventional counterpart.

According to one embodiment, a circuit for performing motion estimation (ME) includes a first and a second memory, and a first and a second registers. The first memory is configured to store a search range of a first frame. The first register has a size smaller than the first memory, and rows of the first register are correspondingly coupled to rows of the first memory. The second memory is configured to store a search range of a second frame. The second register has a size smaller than the second memory, and rows of the second register are correspondingly coupled to rows of the second memory. A metric circuit is configured to calculate a number of block-matching metrics between macro blocks (MBs) in the first register and MBs in the second register, followed by shifting one pixel position from the first memory to the first shift register and shifting one pixel position from the second memory to the second shift register. The block-matching metric calculation and the pixel shift are iteratively performed through the search range.

According to another embodiment, a circuit for performing motion compensation (MC) includes a first and a second memory, a first and a second registers, and first and second multiplexers. The first memory is configured to store a MC range of the first frame, and the first register has a size of a macro block (MB). Each of the first multiplexers is configured to couple each row of the first register to corresponding row of the first memory, and each MB may accordingly be selected from the first memory and loaded into the first register. The second memory is configured to store a MC range of the second frame, and the second register has a size of the macro block (MB). Each of the second multiplexers is configured to couple each row of the second register to corresponding row of the second memory, and each MB may accordingly be selected from the second memory and loaded into the second register.

BRIEF DESCRIPTION OF THE DRAWINGS

FIG. 3 shows MB moving-order diagrams corresponding to the MB moving-track diagrams of FIG. 2 respectively;

FIG. 4 shows an example of MB movement;

DETAILED DESCRIPTION OF THE INVENTION

Figure 1:
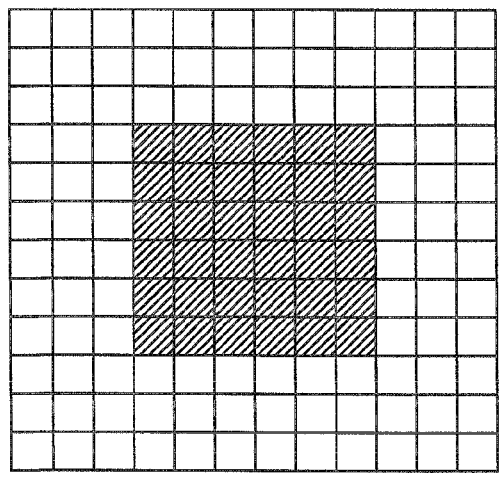
FIG. 1 shows moving-vector (MV) search ranges of two frames respectively.
Figure 1:
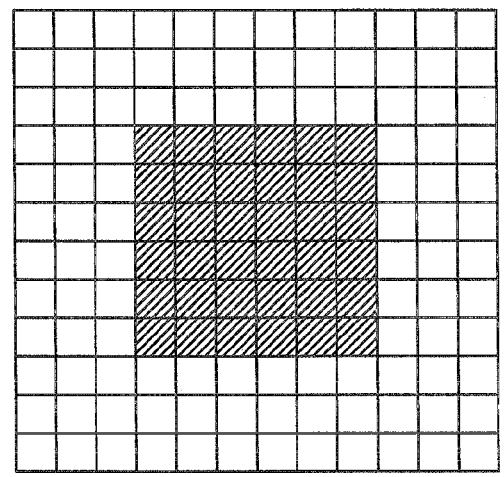
Figure 2:
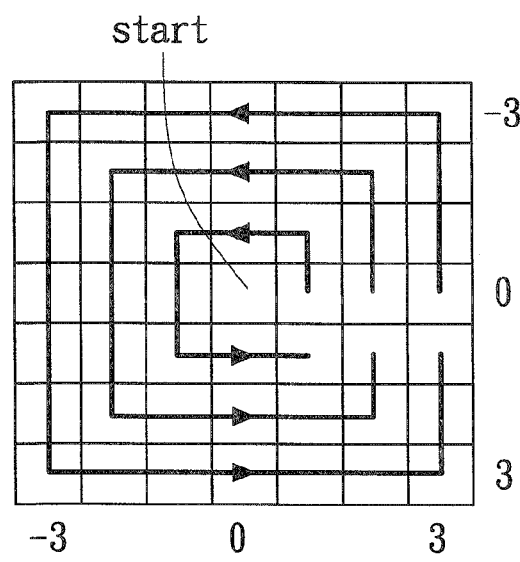
FIG. 2 schematically shows MB moving-track diagrams of the two frames respectively according to one algorithm for determining an MV.
Figure 2:
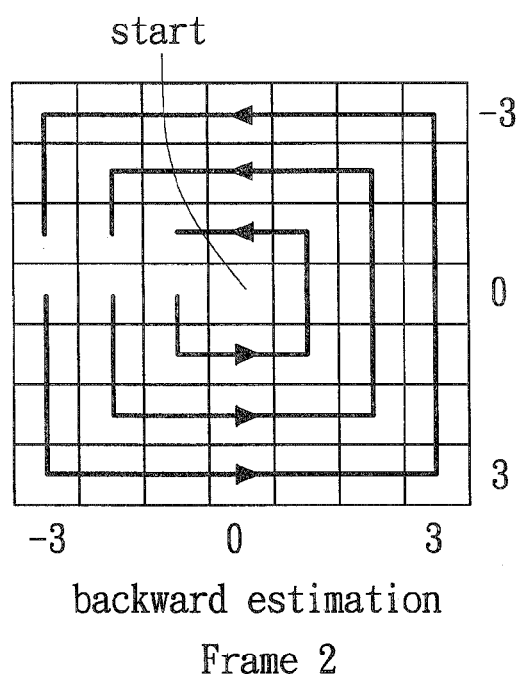

FIG. 1 shows moving-vector (MV) search ranges of two frames, e.g., frame 1 and frame 2, respectively. The frame 1 and the frame 2 may, in general, a reference frame (such as a preceding frame) and a current frame respectively. In the example, each MV search range is a 12×12 matrix. At the center of each MV search range is a motion block (or macro block, MB), that is, for example, a 6×6 matrix. FIG. 2 schematically shows MB moving-track diagrams of the two frames respectively according to one algorithm for determining an MV. Each block of the MB moving-track diagram represents a location of the MB. For example, the location of the center is (0, 0), and the location to the right of the center has a positive horizontal coordinate, and the location down the center has a positive vertical coordinate. With respect to the frame-1 MB moving-track diagram, the MB is moved in a forward-estimation manner. With respect to the frame-2 MB moving-track diagram, the MB is moved in a backward-estimation manner. In other words, the frame-1 MB and the frame-2 MB move symmetrically in an opposing manner. FIG. 3 shows MB moving-order diagrams corresponding to the MB moving-track diagrams of FIG. 2 respectively. As shown in the diagram, each MB moves 49 times in total.

According to the MV determination algorithm illustrated in FIG. 2 and FIG. 3, at each time, a sum of the absolute differences (SAD) is calculated. Specifically, at each time (or location), the absolute value of the difference (or absolute difference, AD) between each pixel in the frame-1 MB and the corresponding pixel in the frame-2 MB is calculated. The absolute values AD of all 36 pixels are then summed up to obtain the SAD. Therefore, 49 SADs are obtained in total, and are called full-SAD.

According to the obtained 49 SADs, the locations of the (frame-1 and frame-2) MBs with least SAD are thus determined as half of the moving-vector (i.e., ½ MV). The frame-1 MB location is then subtracted from the frame-2 MB location, thereby obtaining the MV. FIG. 4 shows an example, in which the frame-2 MB moves three steps to the right and three steps down the center (i.e., (3, 3)), and the frame-1 MB moves three steps to the left and three steps up the center (i.e., (−3, −3)). After the subtraction, an MV of (6, 6) is thus obtained. It is noted that, if there are two or more than two MB locations with the same least SAD in the frame, the MB location nearest to the center is selected. Moreover, if those MB locations with the same least SAD have the same distance from the center, the MB location that has corresponding least numeral in the MB moving-order diagram (FIG. 3) is selected.

In implementing the MV determination algorithm discussed above into hardware circuitry, two 12×12 pixel registers are required to store the MV search ranges respectively. In addition, a 49-to-1 multiplexer (MUX) is needed for each of the 36 pixels of the MB. As each pixel is represented by 24 bits (e.g., 8 for red, 8 for green 8, and 8 for blue), the total number of required MUXs becomes 36*24. These MUXs and their associated wirings are too tremendous to be practically implemented. Accordingly, an alternative algorithm need be disclosed.

Figure 5:
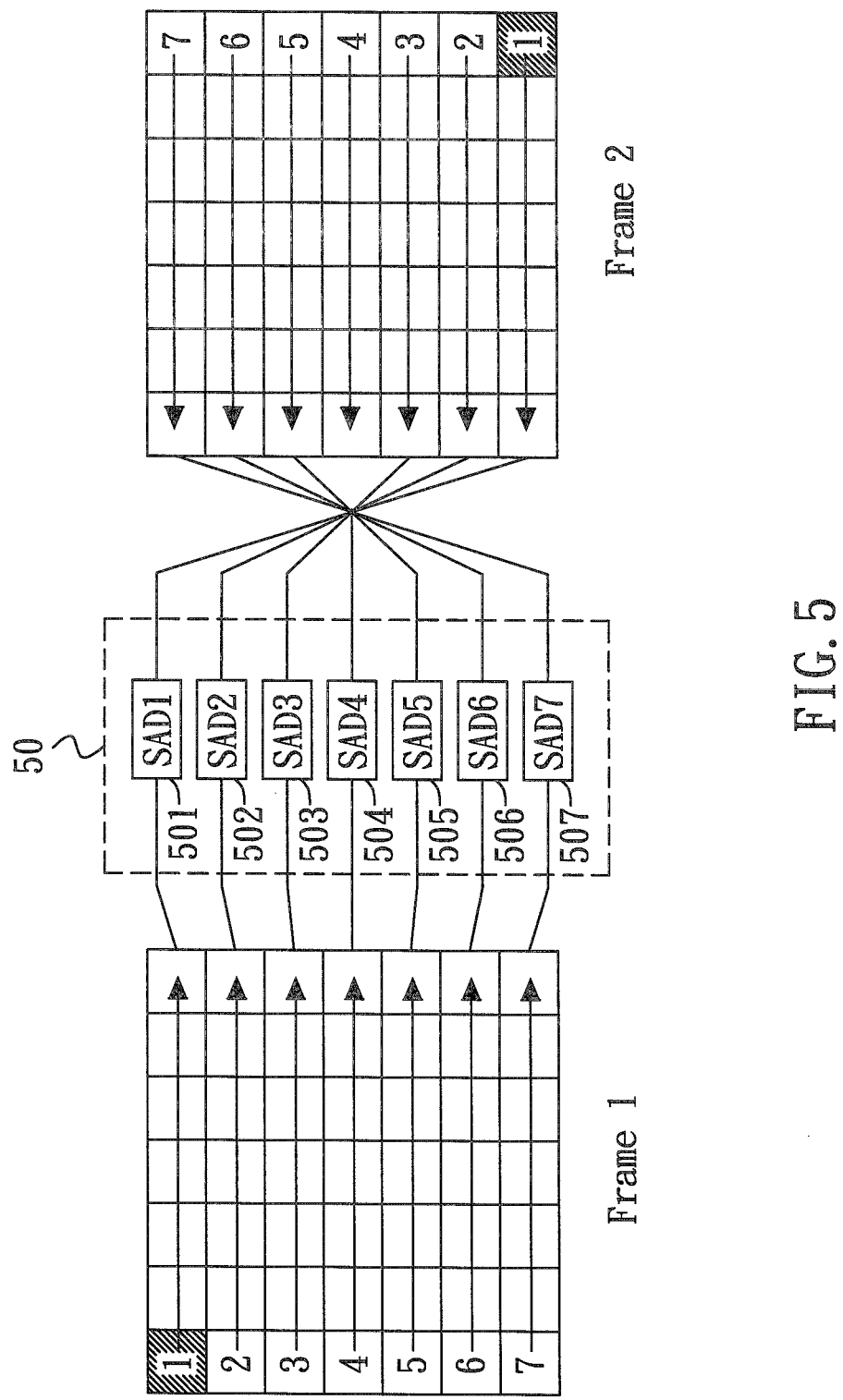
FIG. 5 schematically shows MB moving-track diagrams of two frames respectively of an improved algorithm for determining an MV according to one embodiment of the present invention.

FIG. 5 schematically shows MB moving-track diagrams of two frames respectively of an improved algorithm for determining an MV according to one embodiment of the present invention. Each block of the MB moving-track diagram represents a location of the MB. Between the frame 1 and the frame 2 is a metric circuit 50 that is used to calculate block-matching metrics such as SADs. In the embodiment, the metric circuit 50 includes seven SAD circuits 501-507 that respectively receive the first MB row through the seventh MB row of frame 1, and respectively receive the seventh MB row through the first MB row of frame 2. At the beginning, the metric circuit 50 receives the first MBs of the corresponding MB rows of frame 1, and receives the last MBs of the corresponding MB rows of frame 2. Next, the metric circuit 50 receives the second MBs of the corresponding MB rows of frame 1, and receives the second to the last MBs of the corresponding MB rows of frame 2. The SADs are calculated in this fashion until entire MV search range has been gone through. In this improved algorithm, the frame-1 MB and the frame-2 MB also move symmetrically in an opposing manner. The MB moving-order diagrams shown in FIG. 3 are also adaptable to this algorithm and will be utilized later as weightings in the algorithm, although the numerals no longer represent the order of the MBs movement.

Figure 6:
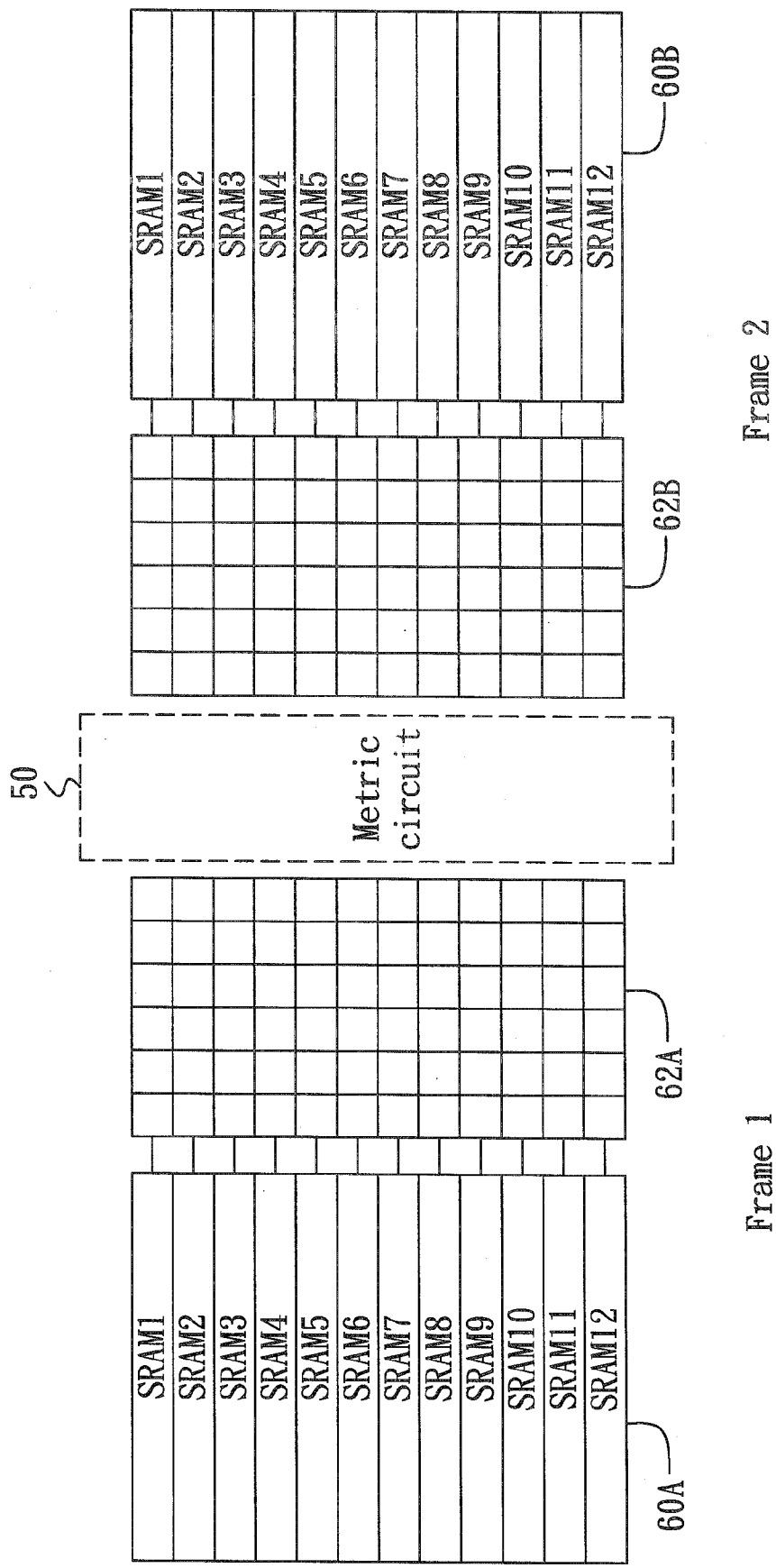
FIG. 6 shows a circuit for generating SADs associated with the MV determination algorithm in FIG. 5 according to one embodiment of the present invention.

FIG. 6 shows a circuit for generating SADs associated with the MV determination algorithm in FIG. 5 according to one embodiment of the present invention. Although SAD is adopted in the embodiment, it is appreciated that other block-matching metric may be used instead. With respect to the frame 1, a first memory such as a first static random access memory (SRAM) 60A is provided for storing the entire 12×12 pixel matrix of FIG. 1. The first SRAM 60A includes 12 rows, e.g., SRAM1 to SRAM12, and each row includes pixels with each pixel containing, for example, 24 bits. In addition, a first register 62A having a size of 12×6 is provided. Each row of the first register 62A is electrically coupled to the right of each corresponding row of the first SRAM 60A. With respect to the frame 2, a second SRAM 60B having a size of 12×12 and a second register 62B having a size of 12×6 are provided. Each row of the second register 62B is electrically coupled to the left of each corresponding row of the second SRAM 60B.

Figure 7A:
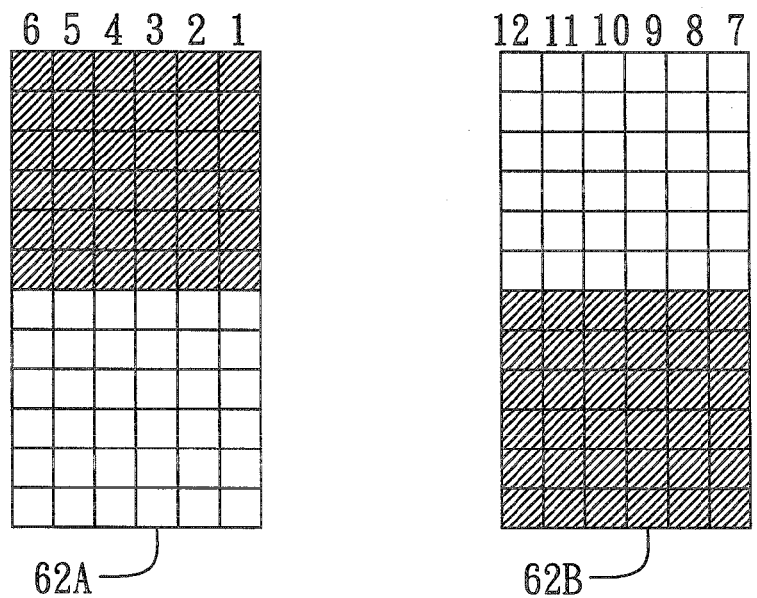
FIG. 7A to FIG. 7C show examples of calculating SAD between the MBs in the two registers.
Figure 7B:
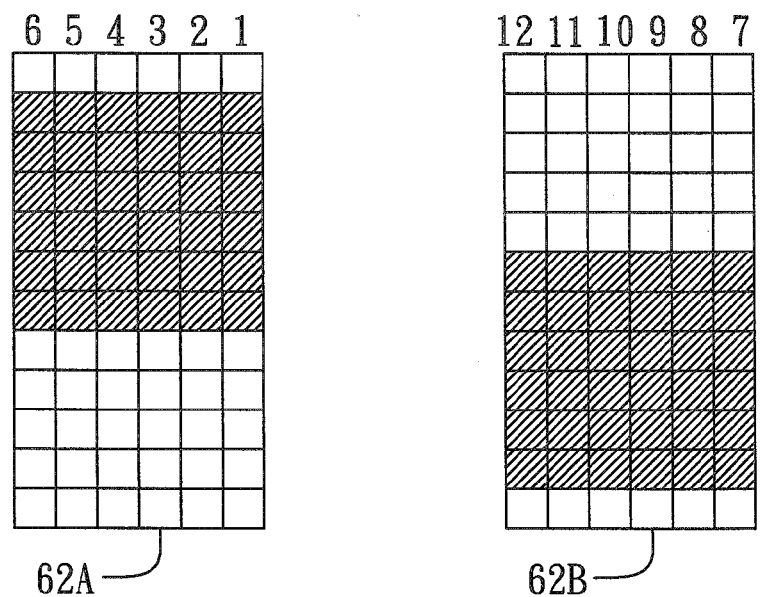
Figure 7C:
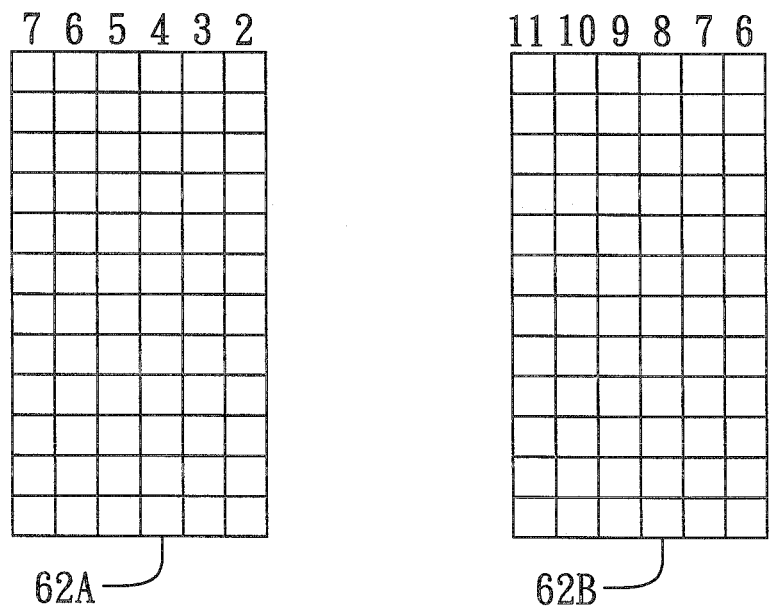

According to the circuit of FIG. 6, at each time, seven SADs are calculated. At first, as exemplified in FIG. 7A, the first six pixels of each first SRAM 60A row are stored in the first register 62A, and the last six pixels of each second SRAM 60B row are stored in the second register 62B. Subsequently, the SAD between the topmost MB of 6×6 pixels in the first register 62A and the bottommost MB of 6×6 pixels in the second register 62B is calculated by the first SAD circuit (SAD1) 501. At the same time, as exemplified in FIG. 7B, the SAD between the next MB (i.e., the second row through the seventh row) in the first register 62A and the next MB (i.e., the sixth row through the eleventh row) in the second register 62B is calculated by the second SAD circuit (SAD2) 502. Therefore, 7 SADs may be obtained through the entire pixels of the first and second registers 62A and 62B. Afterwards, as exemplified in FIG. 7C, the first register 62A is right-shifted such that the seventh pixel of each first SRAM 60A row is shifted into the first register 62A (and the rightmost column of the first register 62A is then shifted out). Similarly, the second register 62B is left-shifted such that the six pixel of each second SRAM 60B row is left-shifted into the second register 62B (and the leftmost column of the second register 62B is then shifted out). Accordingly, further 7 SADs may be obtained through the entire pixels of the first and second registers 62A and 62B. The procedure described above is iterated until all 49 SADs have been obtained through the entire MV search range.

According to the obtained 49 SADs, the locations of the (frame-1 and frame-2) MBs with least SAD are determined as half of the moving-vector (i.e., ½ MV). The frame-1 MB location is then subtracted from the frame-2 MB location, thereby obtaining the MV. As exemplified in FIG. 4, after the subtraction, an MV of (6, 6) is thus obtained. It is noted that, if there are two or more than two MB locations with the same least SAD in the frame, the MB location nearest to the center is selected. Moreover, if those MB locations with the same least SAD have the same distance from the center (i.e., weighting 0 in FIG. 3), the MB location that has corresponding least numeral (or weighting) in the MB moving-order diagram (FIG. 3) is selected.

According to the embodiment illustrated in FIG. 5 and FIG. 6, seven SAD circuits 501-507 are used while no MUX is required in implementing the MV determination algorithm, and the associated wirings and circuit area may thus be substantially reduced.

Figure 8:
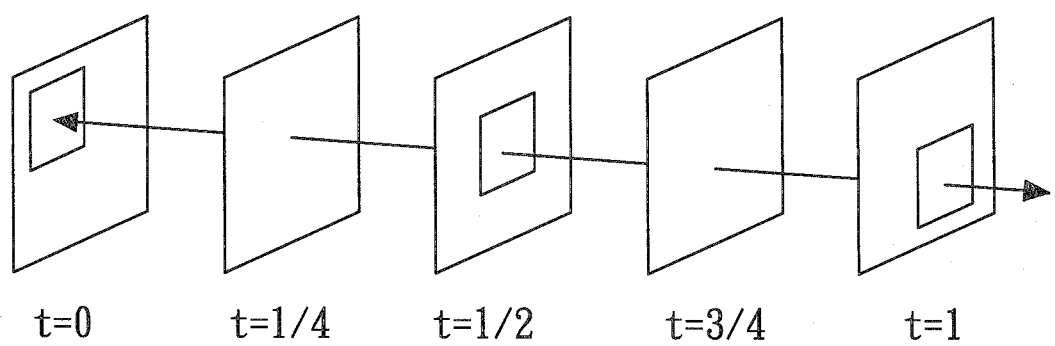
FIG. 8 shows an example of determining ME.

After obtaining the MV, corresponding motion estimation (ME) may be generated. For example, regarding a video with a frame rate of 60 hertz (Hz), the ME may be expressed as ME=MV*t*/(1/60) (t=0-1/60) or ME=MV*t*60, where t denotes time elapsed between two frames as exemplified in FIG. 8.

Figure 9:
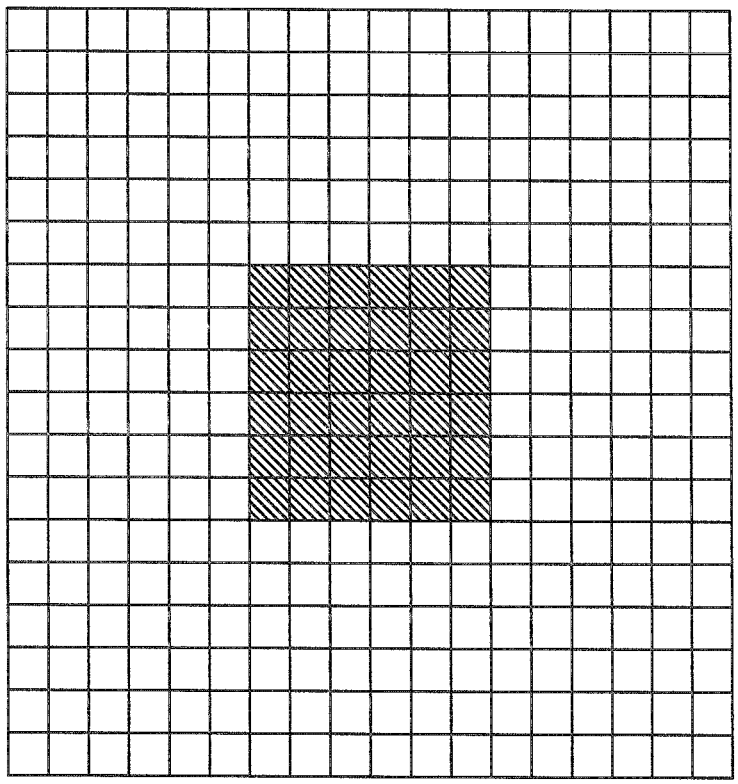
FIG. 9 shows two MC ranges of the size of 18×18 in the two frames respectively.
Figure 9:
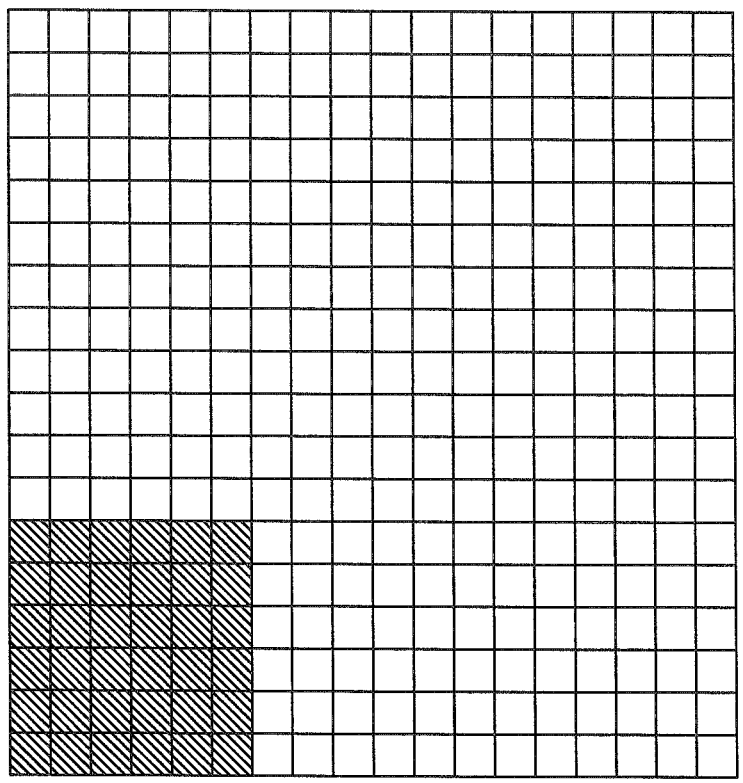

Based on the obtained MV and ME, motion compensation (MC) may be proceeded in order to generate an intermediate frame or frames between given frames. In performing MC, a register with a size of an MC range should be firstly provided. Generally speaking, the width of the MC range is equal to (or less than) the MB width plus 2*(maximum MV). For example, as the MV shown in FIG. 4 is (6, 6), the width of MC range is thus equal to (MB width)+2*(maximum MV) or 18 (=6+2*6). FIG. 9 shows two MC ranges of the size of 18×18 in the two frames respectively.

In an intuitive perspective, each MB in the MC range has 13×13 possible locations. Therefore, 169-to-1 multiplexer (MUX) is needed for each of the 36 pixels of the MB. As each pixel is represented by 24 bits (e.g., 8 for red, 8 for green 8, and 8 for blue), the total number of required MUXs becomes 36*24. These MUXs and their associated wirings are too many to be practically implemented. Accordingly, an alternative implementation should be disclosed.

Figure 10:
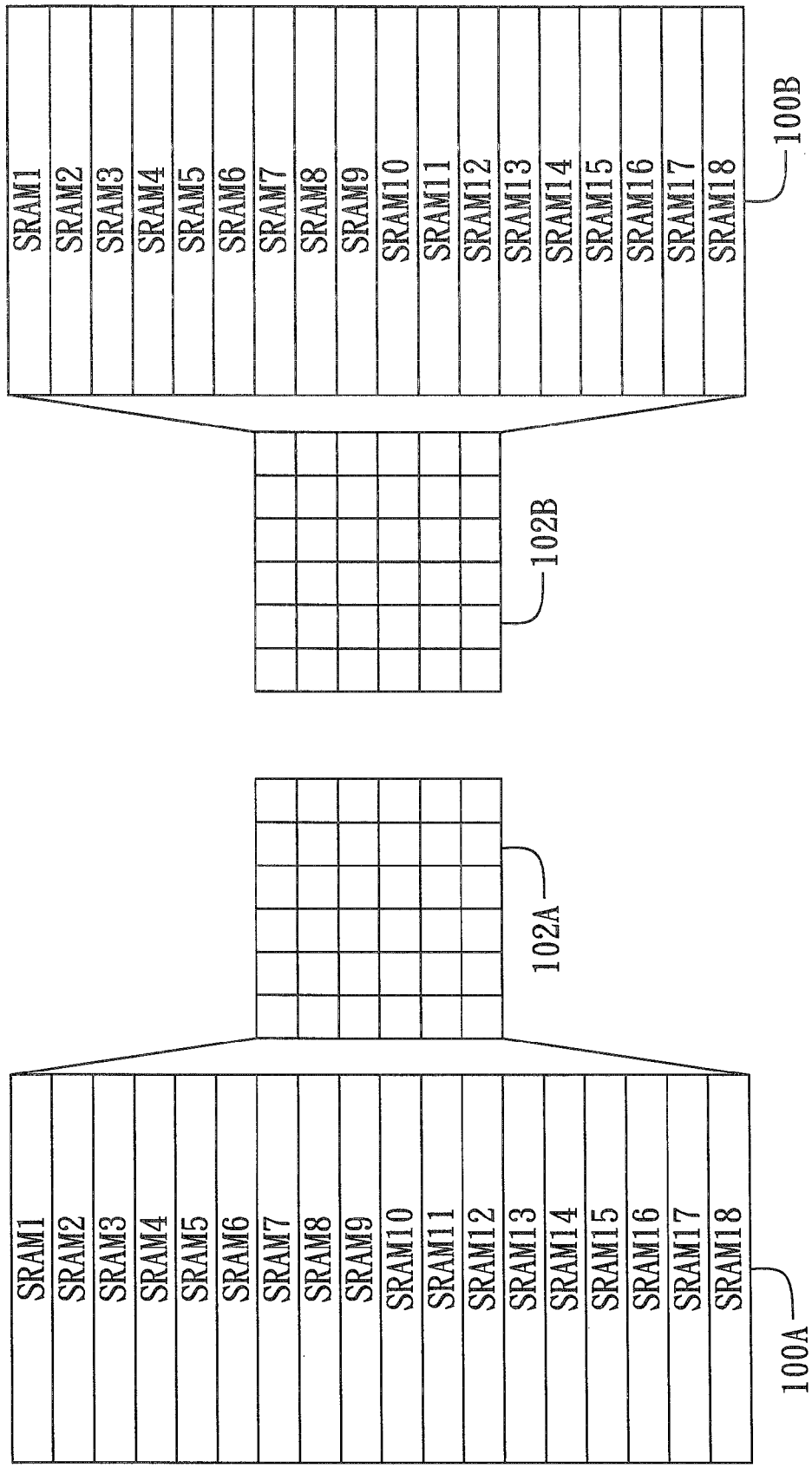
FIG. 10 shows a circuit for performing MC according to one embodiment of the present invention.
Figure 11A:
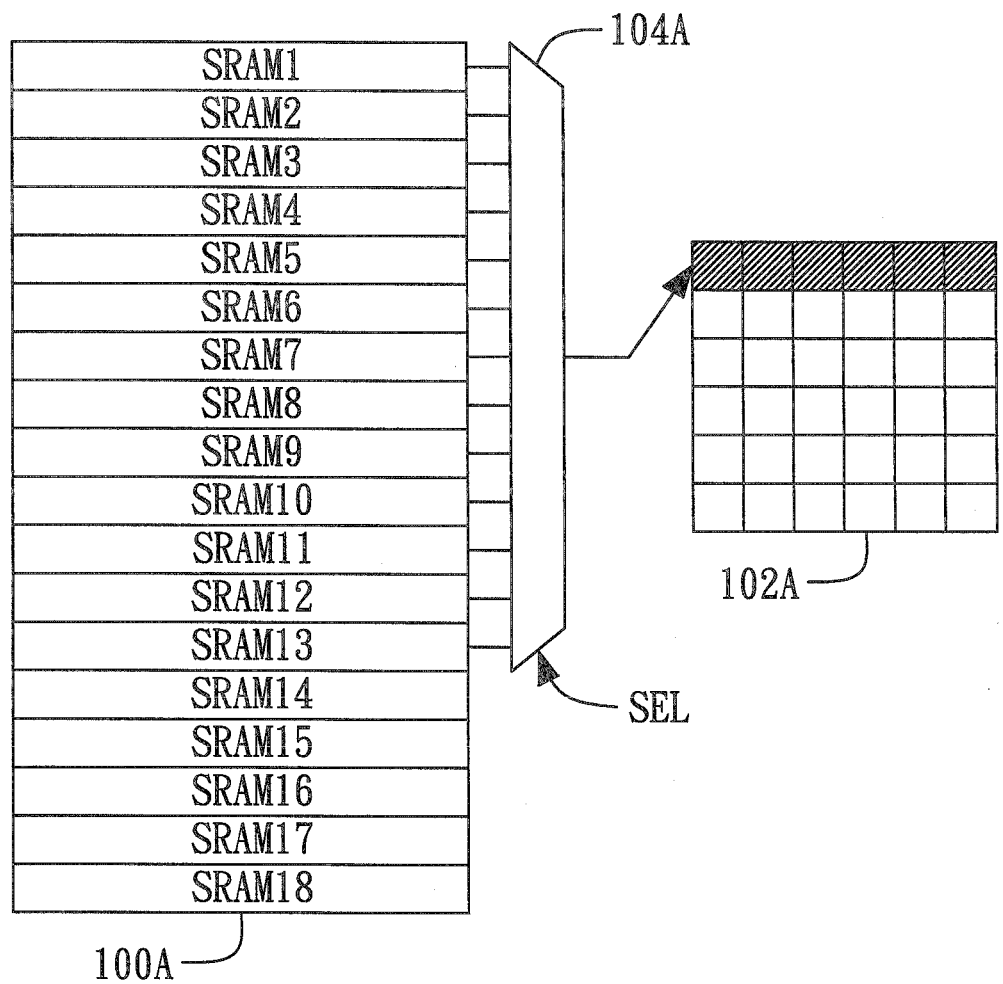
FIG. 11A and FIG. 11B show examples illustrating the configuration among SRAM rows, the MUX and register rows.
Figure 11B:
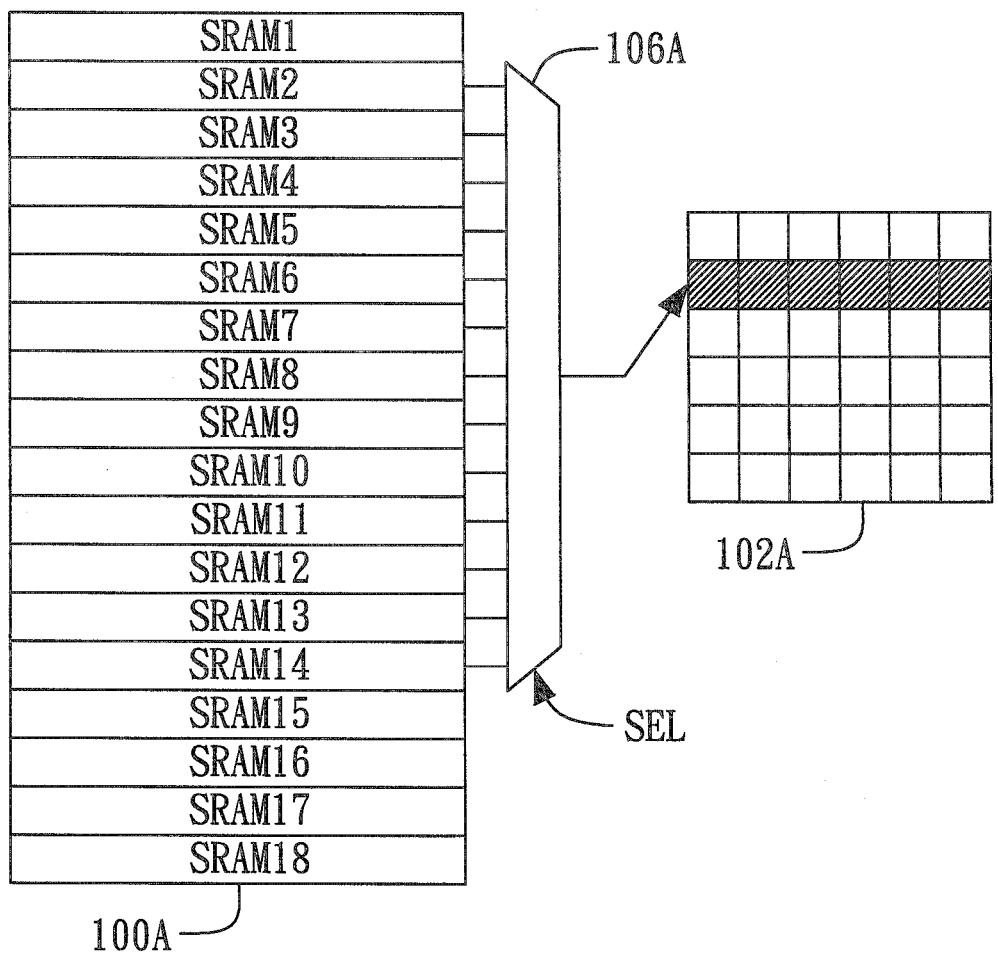

FIG. 10 shows a circuit for performing MC according to one embodiment of the present invention. With respect to the frame 1, a first memory such as a first static random access memory (SRAM) 100A is provided for storing the entire 18×18 pixel matrix of FIG. 9. The SRAM 100A includes 18 rows, e.g., SRAM1 to SRAM18, and each row includes 18 pixels with each pixel containing, for example, 24 bits. In addition, a first register 102A having a size of 6×6 is provided. Each row of the first register 102A is electrically coupled to the right of each corresponding row of the first SRAM 100A via a first MUX. FIG. 11A shows an exemplary configuration among the first thirteen rows of the first SRAM 100A, a 13-to-1 first MUX 104A, and the first row of the first register 102A. FIG. 11B shows another exemplary configuration among the rows 2-14 of the first SRAM 100A, another first MUX 106A, and the second row of the first register 102A. Similarly, with respect to the frame 2, a second SRAM 100B having a size of 18×18 and a second register 102B having a size of 6×6 are provided. Each row of the second register 102B is electrically coupled to the left of each corresponding row of the second SRAM 100B via a second MUX.

According to the disclosed circuit shown in FIG. 10 and FIG. 11, each MB may be selected from the first/second SRAM 100A/100B and then loaded into the first/second register 102A/102B respectively. Specifically, with respect to the horizontal direction in FIG. 10, the pixel of each SRAM row of the first SRAM 100A (e.g., SRAM1 through SRAM18) may be selected by addressing the first SRAM 100A with a corresponding address. Upon selecting one pixel, the other five pixels to the right of the selected pixel may be right-shifted in order to the first register 102A. Furthermore, with respect to the vertical direction in FIG. 10, the SRAM row of the first SRAM 100A may be selected by controlling the first MUX (e.g., 104A or 106A in FIG. 11A/B) with a corresponding select signal SEL. The SRAM addressing and the MUX selecting with the frame 2 may be performed in a similar manner with the exception that the pixels in the second SRAM 100B are left-shifted rather than right-shifted. It is noted that, with respect to an ME(x, y), the SRAM addresses of the MB, in this example, should be (7+x) through (12+x), where 7 though 12 are located in the center of the MC range. The select signal SEL of the MB should correspond to the MUXs associated with the SRAM row (7+y) through the SRAM row (12+y).

According to the embodiment, with respect to the 36 (=6×6) pixels of the MB, thirty-six 13-to-1 MUXs are needed. As each pixel is represented by 24 bits (e.g., 8 for red, 8 for green 8, and 8 for blue), the total number of required MUXs becomes 36*24. Compared to the aforementioned intuitive perspective that requires 36*24 169-to-1 MUXs, the present embodiment instead requires 36*24 13-to-1 MUXs, therefore substantially reducing associated wirings and circuit area.

Although specific embodiments have been illustrated and described, it will be appreciated by those skilled in the art that various modifications may be made without departing from the scope of the present invention, which is intended to be limited solely by the appended claims.

What is claimed is:

1. A circuit for performing motion estimation (ME), comprising:

a first memory configured to store pixels in a search range of a first frame;
a first register having a size smaller than the first memory, rows of the first register being correspondingly coupled to rows of the first memory;
a second memory configured to store pixels in a search range of a second frame;
a second register having a size smaller than the second memory, rows of the second register being correspondingly coupled to rows of the second memory; and
a metric circuit configured to calculate a plurality of block-matching metrics between macro blocks (MBs) in the first register and MBs in the second register, followed by shifting one pixel position from the first memory to the first shift register and shifting one pixel position from the second memory to the second shift register;
wherein the block-matching metric calculation and the pixel shift are iteratively performed through the search range of the first frame and the search range of the second frame;
wherein the MB of the first frame moves through the search range of the first frame and the MB of the second frame moves through the search range of the second frame, before performing each succeeding block-matching metric calculation in the search range; and
wherein the movement of the MB of the second frame is in symmetrically opposite direction of said movement of the MB of the first frame.

2. The circuit of claim 1, wherein the block-matching metric is sum of absolute differences (SAD).

3. The circuit of claim 1, wherein the search range of the first frame is m×n, an associated first-frame MB is b×b, the first memory has a size of m×n, and the first register has a size of m×b; and wherein the search range of the second frame is m×n, an associated second-frame MB is b×b, the second memory has a size of m×n, and the second register has a size of m×b;

wherein m and n are positive integers, and b is a positive integer not greater than m and n.

4. The circuit of claim 1, wherein MB locations in the first frame and the second frame with least block-matching metric is determined, and a motion vector (MV) is obtained, by subtracting the determined MB location of the first frame from the determined MB location of the second frame.

5. The circuit of claim 4, the MB location nearest to a center of the first frame and the second frame is determined, when there are more than one MB location with the same least block-matching metric.

6. The circuit of claim 4, wherein the motion estimation (ME) is generated according to the obtained MV as follows:

$$ME = MV * t * / (1/f)$$

Wherein f is a frame rate, t denotes time elapsed between the first frame and the second frame, and the time t is between 0 and 1/f.

7. The circuit of claim 1, in calculating the block-matching metrics, the block-matching metric between the MB of the first frame and the MB of the second frame that are symmetrically in an opposing direction to each other is calculated.

8. The circuit of claim 1, wherein the first memory is a first static random access memory (SRAM), and the second memory is a second SRAM.

* * * * *